US012739525B2

United States Patent

(12) United States Patent
Singh et al.

(10) Patent No.: US 12,739,525 B2
(45) Date of Patent: Sep. 15, 2026

(54) METHOD AND SYSTEM FOR LONG EXPOSURE PHOTOGRAPHY IN A MULTI-CAMERA DEVICE

(71) Applicant: SAMSUNG ELECTRONICS CO., LTD., Suwon-si (KR)

(72) Inventors: Ashish Kuma Singh, Bengalaru (IN); Abhijit Dey, Bengalaru (IN); Akshit Agarwal, Bengalaru (IN); Sanjay Narasimha Murthy, Bengalaru (IN); Amit Kumar Soni, Bengalaru (IN); Rohan Claude D'Souza, Bengalaru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 71 days.

(21) Appl. No.: 18/887,866

(22) Filed: Sep. 17, 2024

(65) Prior Publication Data

US 2025/0016461 A1 Jan. 9, 2025

Related U.S. Application Data

(63) Continuation of application No. PCT/KR2023/003553, filed on Mar. 16, 2023.

(30) Foreign Application Priority Data

Mar. 17, 2022 (IN) ............................ 202241014914
Feb. 24, 2023 (IN) ............................ 202241014914

(51) Int. Cl.
*H04N 23/951* (2023.01)
*G06T 7/292* (2017.01)
(Continued)

(52) U.S. Cl.
CPC ........... *H04N 23/951* (2023.01); *G06T 7/292* (2017.01); *H04N 23/6811* (2023.01); *H04N 23/86* (2023.01); *G06T 2207/10016* (2013.01)

(58) Field of Classification Search
CPC .. H04N 23/951; H04N 23/86; H04N 23/6811; G06T 7/292; G06T 2207/10016
(Continued)

(56) References Cited

U.S. PATENT DOCUMENTS 8,228,400 B2 7/2012 Liu et al.
8,711,234 B2 4/2014 Tzur et al.
(Continued)

FOREIGN PATENT DOCUMENTS

CN 110213498 A 9/2019
CN 111526314 B 4/2022
(Continued)

OTHER PUBLICATIONS

Examination Report issued on Sep. 2, 2024 by the Indian Patent Office for Indian Patent Application No. 202241014914.
(Continued)

*Primary Examiner* — Joel W Fosselman
(74) *Attorney, Agent, or Firm* — Sughrue Mion, PLLC

(57) ABSTRACT

The present subject matter refers to a controlling method of an electronic apparatus for long exposure photography in a multi-camera device. The method includes receiving first image frames at a first frame rate from a first camera of the multi-camera device, detecting a presence of at least one moving object in each of the first image frames, based on the detection of the at least one moving object in each of the first image frames, utilizing a second camera for receiving second image frames at a second frame rate, performing a motion analysis on each of the first image frames for selection of one or more frames among the second image
(Continued)

frames, based on the one or more frames being selected, identifying motion gaps in each of subsequent frames among the selected one or more frames, based on the motion gaps being identified, generating one or more in-place frames, and generating a motion dramatizer image based on the one or more in-place frames.

20 Claims, 18 Drawing Sheets

(51) Int. Cl.
*H04N 23/68* (2023.01)
*H04N 23/86* (2023.01)

(58) Field of Classification Search
USPC .......................................................... 348/222.1
See application file for complete search history.

(56) References Cited

U.S. PATENT DOCUMENTS

| | | | |
|---|---|---|---|
| 11,196,939 | B2 | 12/2021 | Hsieh et al. |
| 2019/0379812 | A1 | 12/2019 | Suman et al. |
| 2020/0244886 | A1 | 7/2020 | Sasaki et al. |
| 2022/0053142 | A1 * | 2/2022 | Manzari ................. H04N 23/69 |
| 2023/0055623 | A1 | 2/2023 | Wei |

FOREIGN PATENT DOCUMENTS

| | | | |
|---|---|---|---|
| JP | 2010-141650 | A | 6/2010 |
| WO | 2017/096859 | A1 | 6/2017 |
| WO | 2021/213341 | A1 | 10/2021 |

OTHER PUBLICATIONS

Communication issued on Mar. 11, 2025 from the European Patent Office for European Patent Application No. 23771124.7.
International Search Report (PCT/ISA/210) issued Jun. 16, 2023 by the International Searching Authority in the International Patent Application No. PCT/KR2023/003553.
Written Opinion (PCT/ISA/237) issued Jun. 16, 2023 by the International Searching Authority in the International Patent Application No. PCT/KR2023/003553.
Communication dated Jun. 8, 2026, issued by Intellectual Property India in Indian Application No. 202241014914.

* cited by examiner

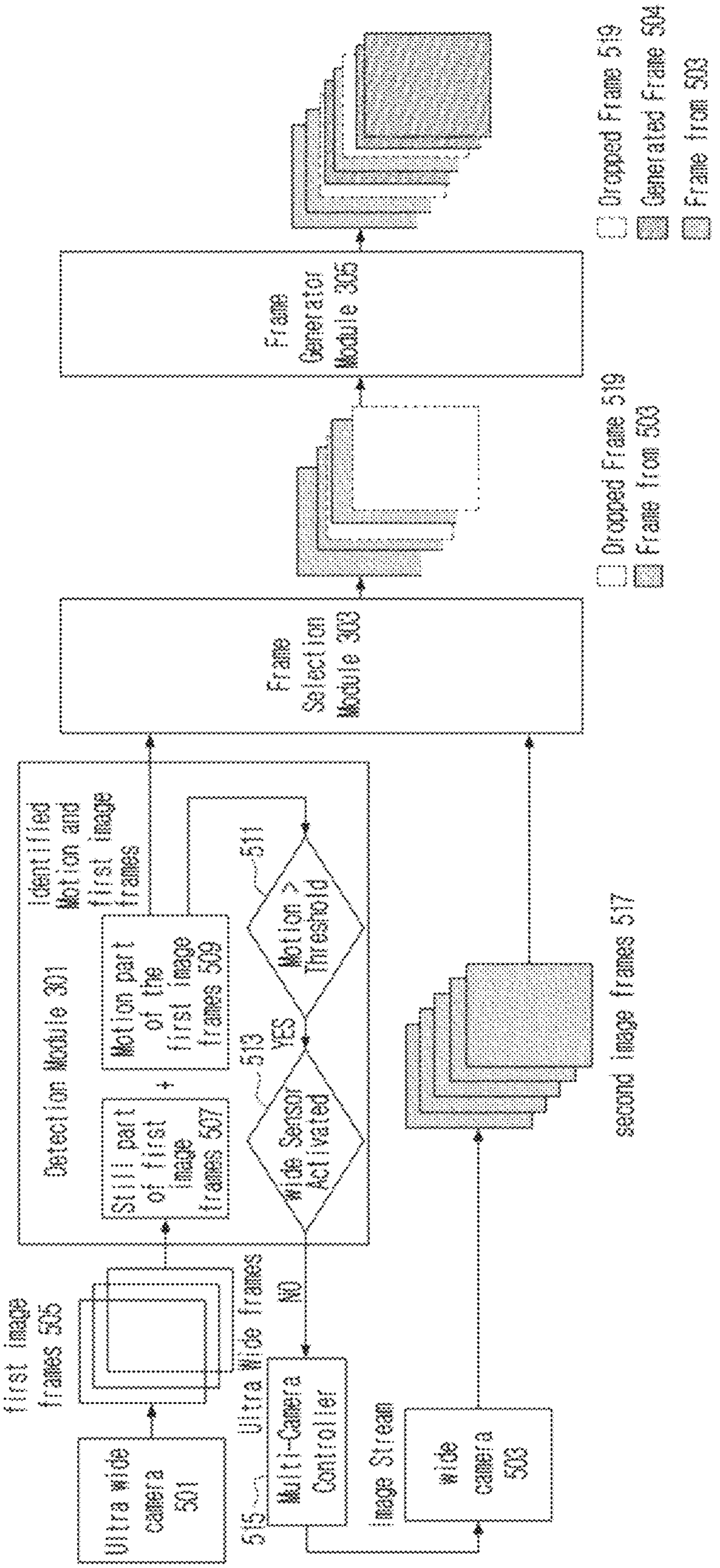

FIG. 5
Ultra wide camera 501
first image frames 505
Ultra Wide frames
515
Multi-Camera Controller
NO
Image Stream
wide camera 503
Detection Module 301
Still part of first image frames 507
Motion part of the first image frames 509
Wide Sensor Activated
513
YES
Motion > Threshold
511
Identified Motion and first image frames
second image frames 517
Frame Selection Module 303
Dropped Frame 519
Frame from 503
Frame Generator Module 305
Dropped Frame 519
Generated Frame 504
Frame from 503

Identified information from Wide,

F_w0

F_w1

F_t0

F_t1

F_t2

F_t3

F_t4 t=0s t=1/120s t=2/120s t=3/120s t=4/120s

Frame Selection Module

UW

Wide

UW: 30 FPS

Wide: 120 FPS

F_t0

F_t3

F_t4

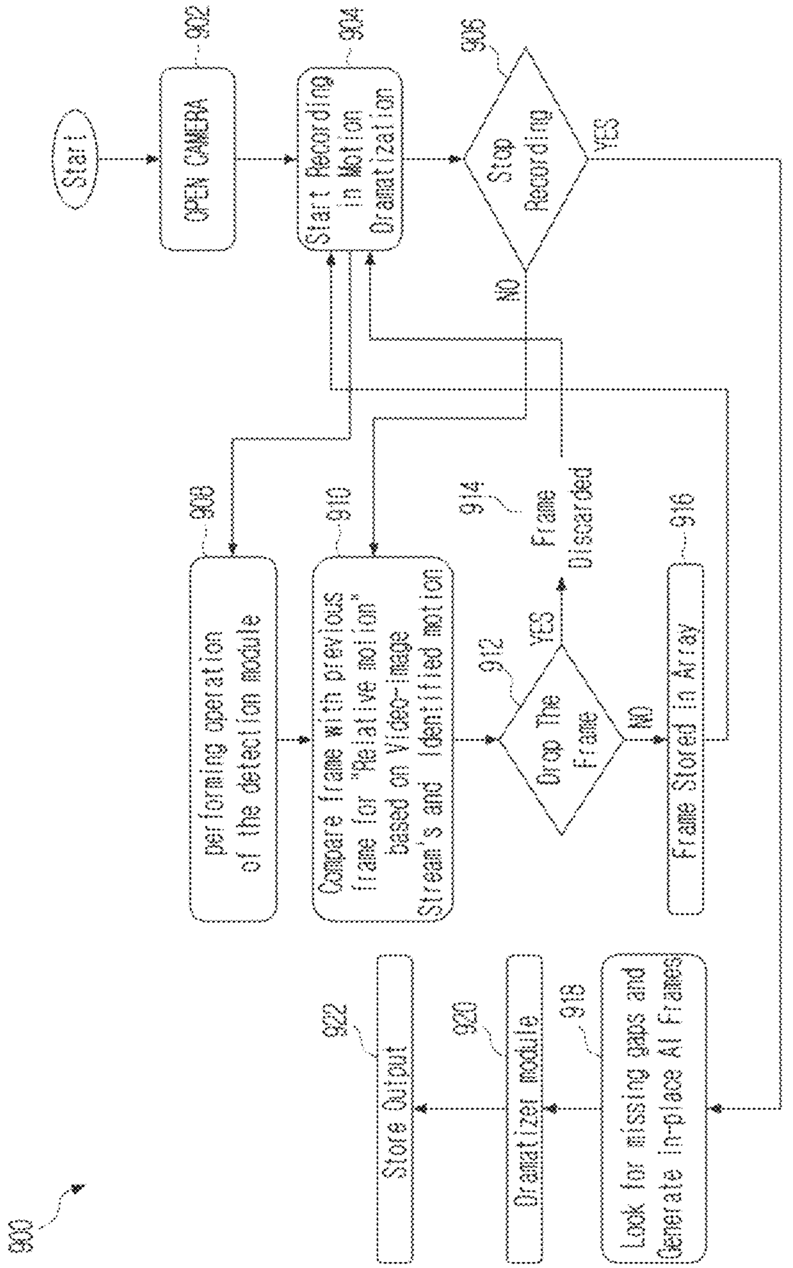

Start

OPEN CAMERA 902

Start Recording in Motion Dramatization 904

Stop Recording 906

YES

NO performing operation of the detection module 908

Compare frame with previous frame for "Relative motion" based on Video-image Stream's and Identified motion 910

Drop The Frame 912

YES

NO

Frame Discarded 914

Frame Stored in Array 916

Look for missing gaps and Generate in-place AI Frames 918

Dramatizer module 920

Store Output 922

METHOD AND SYSTEM FOR LONG EXPOSURE PHOTOGRAPHY IN A MULTI-CAMERA DEVICE

CROSS-REFERENCE TO RELATED APPLICATIONS

This application is a by-pass continuation of International Application No. PCT/KR2023/003553, filed on Mar. 16, 2023, which is based on and claims priority to Indian Patent Application No. 202241014914, filed on Mar. 17, 2022, and Indian Patent Application No. 202241014914, filed on Feb. 24, 2023, the disclosures of which are incorporated by reference herein in their entireties.

BACKGROUND

1. Field

The present disclosure generally relates to image processing techniques, more particularly, to a method and a system for long exposure photography in a multi-camera device.

2. Description of Related Art

Generally, capturing artistic photographs using digital cameras or smartphones may involve motion through time. The acquisition of the motion through time is referred to as "Motion Photography." In photographic terms, "Motion Photography" may refer to capturing motion in the form of a still image, and it is method of using still photographs to tell a story. Generally, while performing motion photography, the user is provided with two modes of operation. One mode of operation is related to freezing the action of the subject and another mode of operation is related to taking the photograph in a motion blur state.

Generally, freezing the action involves capturing of the photographic details that are usually imperceptible to the naked eye. Further, in the motion blur state, a scene over a period of time is captured which may provide a sense of speed. Further, the motion photography and creating motion dramatization require advanced skill in photography or heavy editing on third-party applications. The user may be required to know the concepts of advanced photography such as adjusting an image sensor's sensitivity with respect to light, a shutter speed, exposure settings, and the like. However, many users are not skilled with advance levels of photography and editing.

Further, with the advent of smartphones and presence of cameras in the smartphones, users are desirous to capture artistic photographs that may involve motion through the smartphones. The users often prefer to capture dramatic pictures directly using an in-built native camera application in the smartphones and would not prefer spending time on complex editing. Further, the known techniques of the prior art bring certain disadvantages such as capturing the motion photo in a manner that involves taking a clip of few seconds and may not capture the movement in the form of a still photograph. The portrait photography technique may fade the background and may not involve creating dramatized effects in the photograph.

Likewise, the other known techniques may involve using extended hardware support to create dramatized effects while capturing a motion photograph. This may add to the complexity and a user's difficulty in capturing motion photographs without going through a complex procedure.

Generally, long exposure photography is a technique that is well accepted among photography experts. Long exposure photography takes advantage of slow shutter speeds for long periods to capture creative and unique images. The shutter speed is one of the important setting parameters in photography.

The shutter speed is the length of time the camera shutter is open and exposing the light onto the image sensor. Shutter speed is responsible for two particular things: changing the brightness of the picture; and creating dramatic effects by either freezing action or blurring motion.

FIG. 1A illustrates a change of image brightness in accordance with the shutter speed. As can be seen from FIG. 1A, the longer the shutter speed brighter the images look. Further, when the camera is set to a long shutter speed, the image is prone to blur. Now the blur can appear in the image in two ways as shown in FIG. 1B which illustrates an example of motion blur (caused by movement of the subject) and camera blur (caused by camera shake).

When the camera is set to the long shutter speed, the image is prone to both types of blur as shown in FIG. 1B. Thus, if the images are turning out blurry then a user would normally opt for a faster shutter speed or make the subject stay still. Accordingly, efficient implementation of long exposure photography the following additional hardware/functionalities are typically required: Camera with Manual Functions, Sturdy Tripod, a remote shutter release (Bulb Mode), and neutral Density filters.

Accordingly, the above mentioned hardware is either optional or not included in the generally available smartphones. Further, adjusting an exposure time of the shutter speed for more than 1 sec duration outputs an overexposed white image. Furthermore, keeping the exposure time of the shutter speed for less than 1 sec duration is generally only performed in a daytime setting. Furthermore, the long exposure photography using pro-mode techniques provides various artifacts in the captured image and invites camera shake which is undesirable.

Therefore, there is a need for a solution to overcome the drawbacks mentioned above.

SUMMARY

According to an aspect of the disclosure, a method for controlling an electronic apparatus for performing long exposure photography in a multi-camera device includes: receiving first image frames at a first frame rate from a first camera of the multi-camera device; detecting a presence of at least one moving object in each of the first image frames; based on the detection of the at least one moving object in each of the first image frames, utilizing a second camera for receiving second image frames at a second frame rate; performing a motion analysis on each of the first image frames; selecting one or more frames among the second image frames based on the motion analysis; based on the one or more frames among the second image frames being selected, identifying motion gaps in each of subsequent frames among the selected one or more frames; based on the motion gaps being identified, generating one or more in-place frames; and generating a motion dramatizer image based on the one or more in-place frames.

The detecting the presence of the at least one moving object may include: identifying one or more still frames and one or more motion frames among the first image frames; comparing a motion value in each of the identified one or more motion frames with a first threshold value; and detecting the presence of the at least one moving object in each of the first image frames based on the comparison.

The detecting the presence of the at least one moving object in each of the first image frames based on the comparison may include: detecting the presence of the at least one moving object in each of the first image frames based on the motion value in each of the identified one or more motion frames exceeding the first threshold value, and wherein the method may further include: storing the identified one or more motion frames.

The first image frames may include one or more first type of frames, the second image frames may include one or more second type of frames, and the performing the motion analysis on each of the first image frames may include: determining a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skipping one or more of the one or more second type of frames based on the determination that the level of overlap of the at least one image in the two consecutive first type of frames in the second image frames is less than the second threshold value.

The selecting the one or more frames among the second image frames based on the motion analysis may further include selecting the one or more frames among the second image frames based on the determination that the level of overlap of the at least one image in the two consecutive first type of frames in the first image frames is more than the second threshold value, wherein the level of overlap indicates a motion between the two consecutive first type of frames, and wherein the selected one or more frames corresponds to the one or more second type of frames.

The identifying motion gaps may include: separating luma components and chroma components in the selected one or more frames; calculating a velocity of each pixel in the separated luma components of the selected one or more frames; calculating a speed of each pixel in the separated luma components of the selected one or more frames based on the calculated velocity; determining whether the speed of each pixel is greater than a third threshold value; and identifying the motion gaps in each of the one or more frames based on the determination that the speed of each pixel is greater than the third threshold value.

The method may further include: determining a maximum speed of each pixel in the separated luma components of the selected the one or more frames; and estimating a number of frames to be generated as the one or more in-place frames based on the determined maximum speed and a maximum allowable speed, wherein the maximum allowable speed is based on image information indicating whether each of the selected one or more frames is devoid of the motion gaps. Maximum allowable speed may be related to possible maximum motion of each pixel in all luma components of selected frames required for motion dramatization. The luma components may be described as luminance information or brightness information.

The generating the motion dramatizer image may include: aligning the luma components in the selected one or more frames with each other; merging the aligned luma components with the chroma components of the selected one or more frames, the second image frames, and the skipped one or more second type of frames; and generating the motion dramatizer image based on the merging.

The method may further include: determining a light condition based on a lux value obtained from one or more sensors, wherein the light condition includes at least one of a lowlight condition or a night light condition; and recommending a mode from among one or more modes based on the determination of the light condition, wherein the motion dramatizer image is generated based on a selection of the recommended mode.

The one or more first type of frames may correspond to one of frames captured by an ultra wide camera or frames captured by a wide camera, and the one or more second type of frames may corresponds to one of frames captured by the wide camera and frames captured by a telephoto camera.

According to an aspect of the disclosure, a multi-camera device for performing long exposure photography includes: a first camera; a second camera; at least one memory storing one or more instructions; and at least one processor configured to execute the one or more instructions, wherein the one or more instructions, when executed by the at least one processor, cause the multi-camera device to: receive first image frames at a first frame rate from the first camera; detect a presence of at least one moving object in each of the first image frames; based on the detection of the at least one moving object in each of the first image frames, receive second image frames at a second frame rate through the second camera; perform a motion analysis on each of the first image frames; select one or more frames among the second image frames based on the motion analysis; based on the one or more frames being selected, identify motion gaps in each of subsequent frames among the selected one or more frames; based on the motion gaps being identified, generate one or more in-place frames; and generate a motion dramatizer image based on the one or more in-place frames.

The one or more instructions, when executed by the at least one processor, may further cause the multi-camera device to: identify one or more still frames and one or more motion frames among the first image frames; compare a motion value in each of the identified one or more motion frames with a first threshold value; and detect the presence of the at least one moving object in each of the first image frames based on the comparison.

The one or more instructions, when executed by the at least one processor, may further cause the multi-camera device to: detect the presence of the at least one moving object in each of the first image frames based on the motion value in each of the identified one or more motion frames exceeding the first threshold value, and store the identified one or more motion frames.

The first image frames may include one or more first type of frames, the second image frames may include one or more second type of frames, and the one or more instructions, when executed by the at least one processor, may further cause the multi-camera device to: determine a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skip one or more of the one or more second type of frames based on the determination that the level of overlap of the at least one image in the two consecutive first type of frames in the second image frames is less than the second threshold value.

The one or more instructions, when executed by the at least one processor, may further cause the multi-camera device to: select the one or more frames among the second image frames based on the motion analysis based on the determination that the level of overlap of the at least one image in the two consecutive first type of frames in the first image frames is more than the second threshold value, wherein the level of overlap indicates a motion between the two consecutive first type of frames, and wherein the selected one or more frames corresponds to the one or more second type of frames.

According to an aspect of the disclosure, a non-transitory computer readable medium has instructions stored therein, which when executed by at least one processor cause the at least one processor to execute a method of controlling an electronic apparatus for performing long exposure photography in a multi-camera device, where the method includes: receiving first image frames at a first frame rate from a first camera of the multi-camera device; detecting a presence of at least one moving object in each of the first image frames; based on the detection of the at least one moving object in each of the first image frames, utilizing a second camera for receiving second image frames at a second frame rate; performing a motion analysis on each of the first image frames; selecting one or more frames among the second image frames based on the motion analysis; based on the one or more frames among the second image frames being selected, identifying motion gaps in each of subsequent frames among the selected one or more frames; based on the motion gaps being identified, generating one or more in-place frames; and generating a motion dramatizer image based on the one or more in-place frames.

The non-transitory computer readable medium, wherein the detecting the presence of the at least one moving object may include: identifying one or more still frames and one or more motion frames among the first image frames; comparing a motion value in each of the identified one or more motion frames with a first threshold value; and detecting the presence of the at least one moving object in each of the first image frames based on the comparison.

The non-transitory computer readable medium, wherein the detecting the presence of the at least one moving object in each of the first image frames based on the comparison may include: detecting the presence of the at least one moving object in each of the first image frames based on the motion value in each of the identified one or more motion frames exceeding the first threshold value, and wherein the method may further include: storing the identified one or more motion frames.

The non-transitory computer readable medium, wherein the first image frames may include one or more first type of frames, the second image frames may include one or more second type of frames, and the performing the motion analysis on each of the first image frames may include: determining a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skipping one or more of the one or more second type of frames based on the determination that the level of overlap of the at least one image in the two consecutive first type of frames in the second image frames is less than the second threshold value.

The non-transitory computer readable medium, wherein the selecting the one or more frames among the second image frames based on the motion analysis may further include selecting the one or more frames among the second image frames based on the determination that the level of overlap of the at least one image in the two consecutive first type of frames in the first image frames is more than the second threshold value, wherein the level of overlap may indicate a motion between the two consecutive first type of frames, and wherein the selected one or more frames may correspond to the one or more second type of frames.

To further clarify the features of the present disclosure, a more particular description will be rendered by reference to specific embodiments thereof, which are illustrated in the appended drawings. It is appreciated that these drawings depict only typical embodiments and are therefore not to be considered limiting in scope. The disclosure will be described and explained with additional specificity and detail with the accompanying drawings.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates an example embodiment for long exposure photography in the multi-camera device by using a combination of ultra-wide and wide cameras, according to an embodiment of the present disclosure;

FIG. 9 illustrates an operation flow in a scenario where the user is operating the multi-camera device, according to an embodiment of the present disclosure;

Figure 1A:
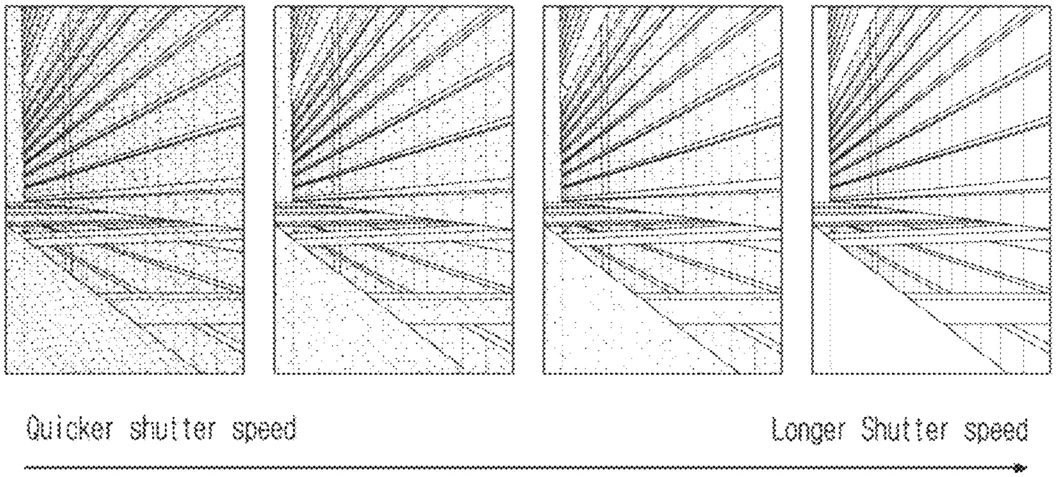
FIG. 1A illustrates a change of image brightness in accordance with the a change in shutter speed.
Figure 1B:
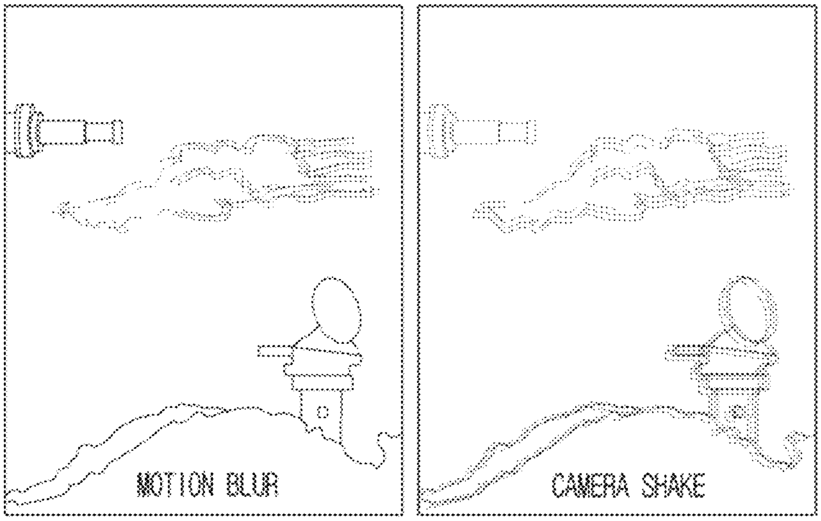
FIG. 1B illustrates an example of motion blur and camera shake.
Figure 1C:
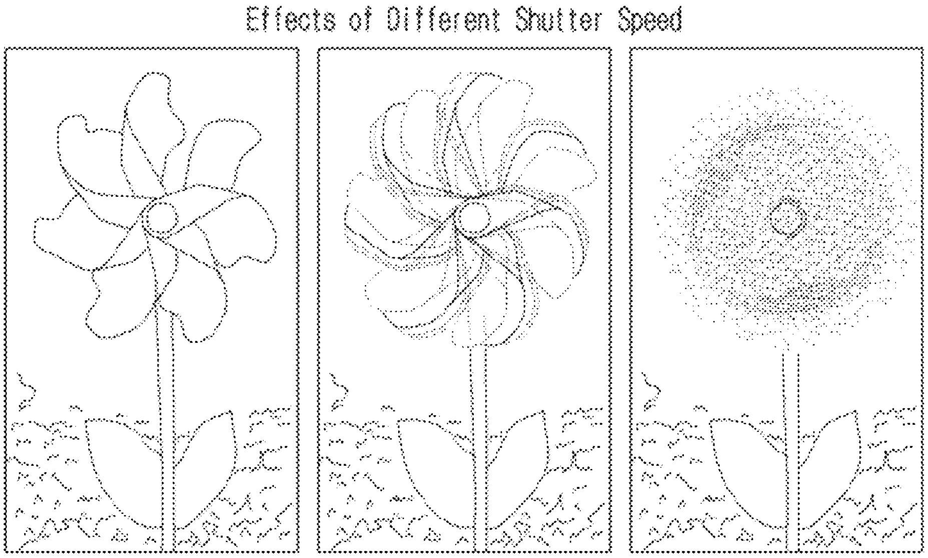
FIG. 1C illustrates the effects of different shutter speeds.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more" or "one or more element is REQUIRED."

Unless otherwise defined, all terms, and especially any technical and/or scientific terms, used herein may be taken to have the same meaning as commonly understood by one having ordinary skill in the art.

As used herein, a plurality of "units", "modules", "members", and "blocks" may be implemented as a single component, or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Throughout the description, when a member is "on" another member, this includes not only when the member is in contact with the other member, but also when there is another member between the two members.

Herein, the expressions "at least one of a, b or c" and "at least one of a, b and c" indicate "only a," "only b," "only c," "both a and b," "both a and c," "both b and c," and "all of a, b, and c."

It will be understood that, although the terms first, second, third, etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

Embodiments of the present disclosure will be described below in detail with reference to the accompanying drawings.

In an embodiment, the system and the method disclose techniques for creating dramatization of the motion in a photograph by selectively using multiple frames that are obtained from a captured image during motion analysis. In an aspect, the multiple frames are selected based on a identified motion in a captured image. According to an embodiment, a video frame is selected from the captured image and is processed for identifying a still part and an in-motion part in the video frame. This still part and in-motion part are processed to identify the motion as a identified motion information. Further, the identified motion information is processed to decide frames that needs to be selected for the effect. Thereafter, motion gaps in each of the subsequent frames are identified. An artificial intelligence (AI) module determines the generation of additional frames for generating a motion dramatization image. A detailed explanation of each of the operations will be explained in the forthcoming paragraph.

Figure 2:
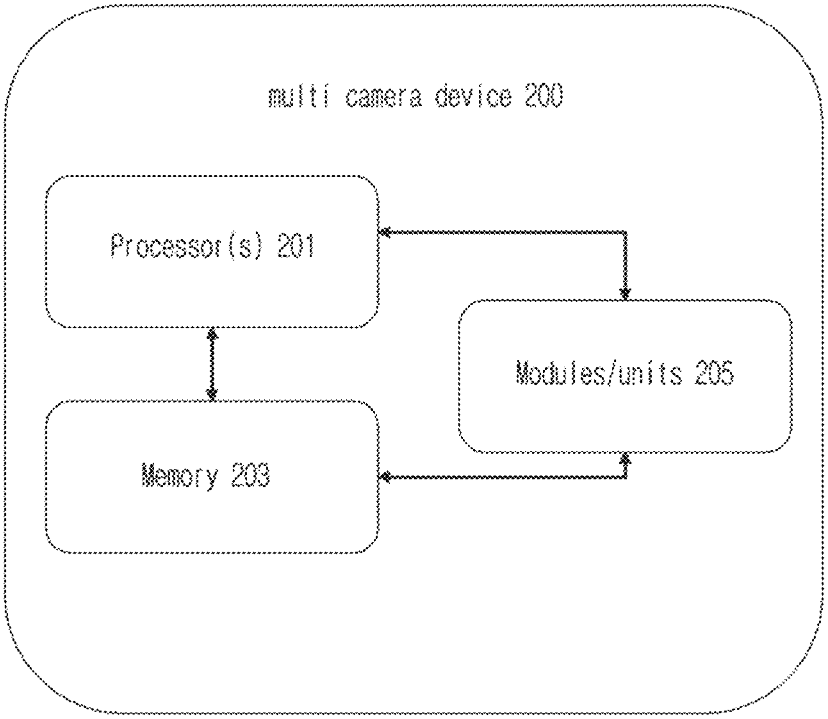
FIG. 2 illustrates a detailed diagram of a multi-camera device according to an embodiment of the present disclosure.

FIG. 2 illustrates a block diagram of an multi-camera device 200 according to an embodiment of the present disclosure. As an example, the multi-camera device 200 may include smartphones, a tablet PC, a personal digital assistant (PDA), a mobile device, or any other machine capable of executing a set of instructions. The multi-camera device 200 includes a processor(s) 201, a memory 203, and a module/engine/unit 205.

Figure 3:
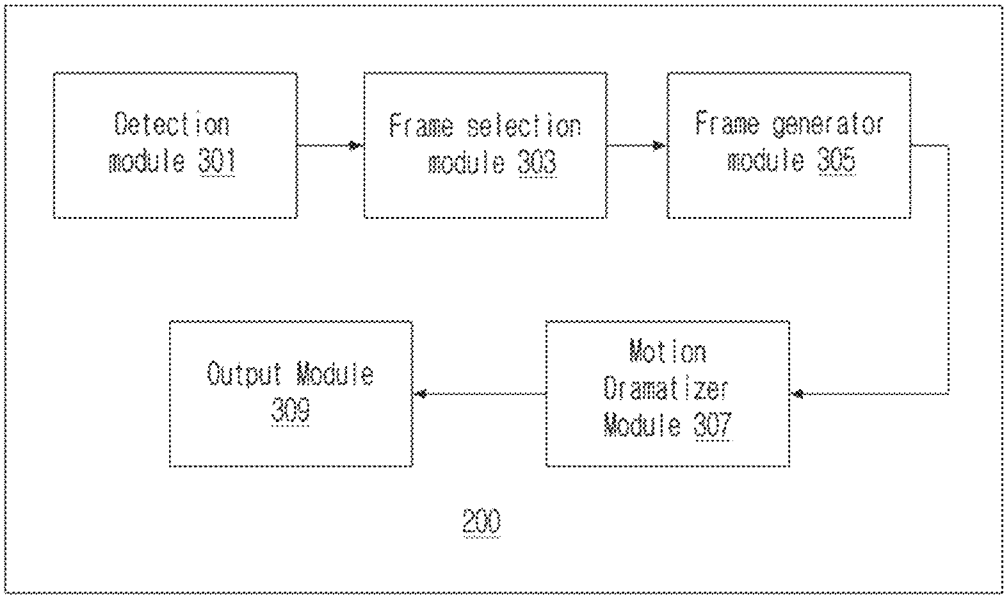
FIG. 3 illustrates a detailed diagram of a multi-camera device according to an embodiment of the present disclosure.

FIG. 3 illustrates a detailed diagram of a multi-camera device 200 according to an embodiment of the present disclosure. The multi-camera device 200 includes a detection module 301, a frame selection module 303, a frame generator module 305, a motion dramatizer module 307, and an output module 309 coupled with each other. As an example, each of the detection module 301, the frame selection module 303, the frame generator module 305, the motion dramatizer module 307, and the output module 309 may include at least one processor coupled with a memory device and a database. In an alternate embodiment, the functions of the aforesaid modules may be performed by the processor(s) 201. The reference numerals have been kept the same for similar components for the ease of understanding.

In an example, the processor(s) 201 may be a single processing unit or a number of units, all of which could include multiple computing units. The processor(s) 201 may be implemented as one or more microprocessors, microcomputers, microcontrollers, digital signal processors, central processing units, logical processors, virtual processors, state machines, logic circuitries, and/or any devices that manipulate signals based on operational instructions. Among other capabilities, the processor(s) 201 may fetch and execute computer-readable instructions and data stored in the memory 203.

The memory 203 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

In an example, the module(s), engine(s), and/or unit(s) 205 may include a program, a subroutine, a portion of a program, a software component or a hardware component capable of performing a stated task or function. As used herein, the module(s), engine(s), and/or unit(s) may be implemented on a hardware component such as a server independently of other modules, or a module can exist with other modules on the same server, or within the same program. The module(s), engine(s), and/or unit(s) may be implemented on a hardware component such as processor one or more microprocessors, microcomputers, microcontrollers, digital signal processors, central processing units, state machines, logic circuitries, and/or any devices that manipulate signals based on operational instructions. The module(s), engine(s), and/or unit(s) 205 when executed by the processor(s) 201 may be configured to perform any of the described functionalities.

As a further example, the database may be implemented with integrated hardware and software. The hardware may include a hardware disk controller with programmable search capabilities or a software system running on general-purpose hardware. The examples of database are, but not limited to, in-memory database, cloud database, distributed database, embedded database and the like. The database amongst other things, serves as a repository for storing data processed, received, and generated by one or more of the processor(s) 201, and the modules/engines/units 205.

The modules/engines/units 205 may be implemented with an AI module that may include a plurality of neural network layers. Examples of neural networks include, but are not limited to, a convolutional neural network (CNN), a deep neural network (DNN), a recurrent neural network (RNN), a Restricted Boltzmann Machine (RBM). The learning technique is a method for training a predetermined target device (for example, a robot) using a plurality of learning data to cause, allow, or control the target device to make a determination or prediction. Examples of the learning techniques include, but are not limited to, a supervised learning, an unsupervised learning, a semi-supervised learning, or a reinforcement learning. At least one of a plurality of CNN, DNN, RNN, RMB models and the like may be implemented to thereby achieve execution of the present subject matter's mechanism through an AI model. A function associated with AI model may be performed through the non-volatile memory, the volatile memory, and the processor. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or the artificial intelligence (AI) model stored in the non-volatile memory and the volatile memory. The predefined operating rule or artificial intelligence model is provided through training or learning. A detailed explanation of each of the aforesaid component as shown in FIG. 3 will be provided through FIGS. 4-9 in the forthcoming paragraphs.

Figure 4:
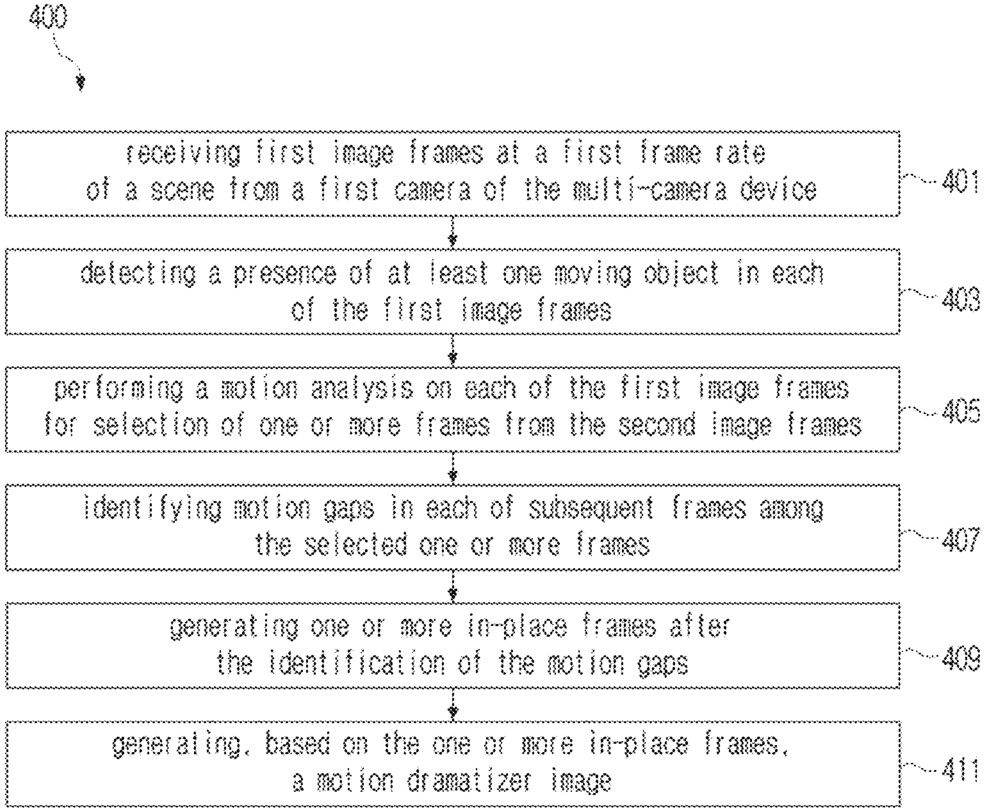
FIG. 4 illustrates a flow chart depicting a method for long exposure photography in a multi-camera device, according to an embodiment of the present disclosure.

FIG. 4 illustrates a flow chart depicting a method for long exposure photography in a multi-camera device, according to an embodiment of the present disclosure. Method 400 as depicted in FIG. 4 is implemented in the multi-camera device 200 as shown in FIGS. 2 and 3. According to an embodiment, various operations may be performed by the processor(s) 201. In an alternate embodiment, the various operations may be performed by various modules of FIG. 3. Explanation of the various operations will be explained henceforth based on the various modules of FIG. 3 for ease of explanation and therefore should not be considered as a limiting the scope of the disclosure. Further, method 400 will be explained through FIGS. 5-7B.

According to an embodiment, the multi-camera device 200 may include various types of cameras such as wide camera, tele camera, and ultra-wide camera with different fields of view. The multi-camera device 200 may include a camera module. The camera module may include at least one camera such as wide camera, tele camera or ultra-wide camera.

The camera module may include at least one of an image sensor, a lens or an Image Signal Processor (ISP). The lens may be included in a lens assembly. The lens assembly may collect light emitted or reflected from an object whose image is to be taken. The lens assembly may include one or more lenses. In an embodiment, the camera module may include a plurality of lens assemblies. In such a case, the camera module may form a dual camera.

The wide camera may have a default field of view. The ultra-wide camera may have a wider field of view compared to the wide camera. The tele camera may have a narrower field of view compared to the wide camera.

In an example, the captured frames may be captured using an Ultra-Wide (UW) camera or a Wide camera. In another example, the captured frame 101 may be captured using a Wide camera or a telephoto (i.e., tele) camera. FIG. 5 illustrates an example embodiment for long exposure photography in a multi-camera device by using a combination of ultra-wide and wide cameras, according to an embodiment of the present disclosure. FIG. 5 shows an ultra-wide camera 501 in combination with a wide camera 503 that operates at different frame rates. According to the example embodiment, the ultra-wide camera 501 may be referred to as a first camera and the wide camera 503 may be referred to as a second camera.

During the long exposure photography the multiple frames of the scene are being captured by the ultra-wide camera 501 at a first frame rate by the multi-camera device 200. Accordingly, the ultra-wide camera 501 may obtain (or capture or generate) first image frames 505. The first image frames 505 may be alternatively referred to as frames captured by the wide camera 503 throughout the disclosure.

Referring back to FIG. 4, at operation 401, the detection module 301 may receive the first image frames 505 at the first frame rate of the scene from a first camera of the multi-camera device 200. According to the example shown in FIG. 5, the first camera corresponds to the ultra-wide camera 501. After receiving the first image frames 505, the detection module 301 may detect, at operation 403, a presence of at least one moving object in each of the first image frames 505. In particular, the detection module 301 detects whether the first image frames 505 include any moving object. Based on this detection operation it is determined whether the first image frames 505 include frames that depict information related to motion.

According to an embodiment, for the detection of the presence of at least one moving object in each of the first image frames 505, the detection module 301 may, at first, identify one or more still part of the first image frames 507 and one or more motion part of the first image frames 509 from among the first image frames 505. The still part of the first image frame may be alternatively referred as still frames and motion part of the first image frames may be alternatively referred as motion frames throughout the disclosure without deviating from the scope of the disclosure. In the example, the one or more still parts of the first image frame 507 may include a subject in the first image frames 505 to be stationary and clearly visible. In further example, the one or more motion parts of the first image frames 509 may include the subject in the first image frames 505 to be in motion.

According to an embodiment, each of the frames in the first image frames 505 are assigned with some motion value based on the motion information present in each of the frames. The detection module 301 is then configured to compare these motion values with a threshold value at block 511. Based on a result of the comparison, the detection module 301 may detect the presence of the at least one moving object in each of the first image frames 505. Accordingly, when the motion value in each of the identified one or more motion frames exceeds the threshold value, the detection module 301 detects the presence of the at least one moving object. In particular, the detection module 301 based on the detection of the presence of the at least one moving object identifies a motion area in the first image frames 505. That is to say the detection module 301 determines that received first image frames 505 have some motion part in the frames. According to an embodiment, the identified one or more motion frames 509 are then stored in a memory buffer of the multi-camera device 200. The memory buffer may be described as a memory or a device memory. The memory 203 may include the memory buffer.

According to an embodiment, after the detection of the presence of the at least one moving object in each of the first image frames 505, the detection module 301 provides a command to a multi-camera controller 515 at block 513. According to an embodiment, the multi-camera controller 515 is included in the multi-camera device 200. According to an embodiment, the function of the multi-camera controller 515 may be performed by the processor(s). Accordingly, the multi-camera controller 515 may turn on the wide camera 503 subsequent to the detection of the at least one moving object in each of the first image frames 505 so that second image frames 517 at a second frame rate are obtained from wide camera 503. The captured second image frames 517 are then received by the frame selection module 303 for further processing. The wide camera 503 may be alternatively referred to as the second camera and frames captured by the wide camera 503 may be alternatively referred to as the second image frames 517 according to the example as shown in FIG. 5. Further, the second image frames 517 may be further stored in the memory buffer. According to an embodiment, the second image frames 517 are then stored in a memory buffer of the multi-camera device 200.

According to an embodiment, the first image frames 505 and the second image frames 517 are provided as input to the frame selection module 303. Further, the identified motion information, that is obtained based on the detection (operation 403) of the presence of the at least one moving object, is also provided as an input to the frame selection module 303. According to an aspect of the present disclosure, the identified motion information taken from the first image frames 505 may be used by the frame selection module 303 as it has a larger (Field-of-View) FOV. The identified motion information can be used to determine whether any object will start the FOV of the Wide camera. This helps in identifying the start or end of the motion that might not be visible in the FOV of the Wide camera.

Figure 6:
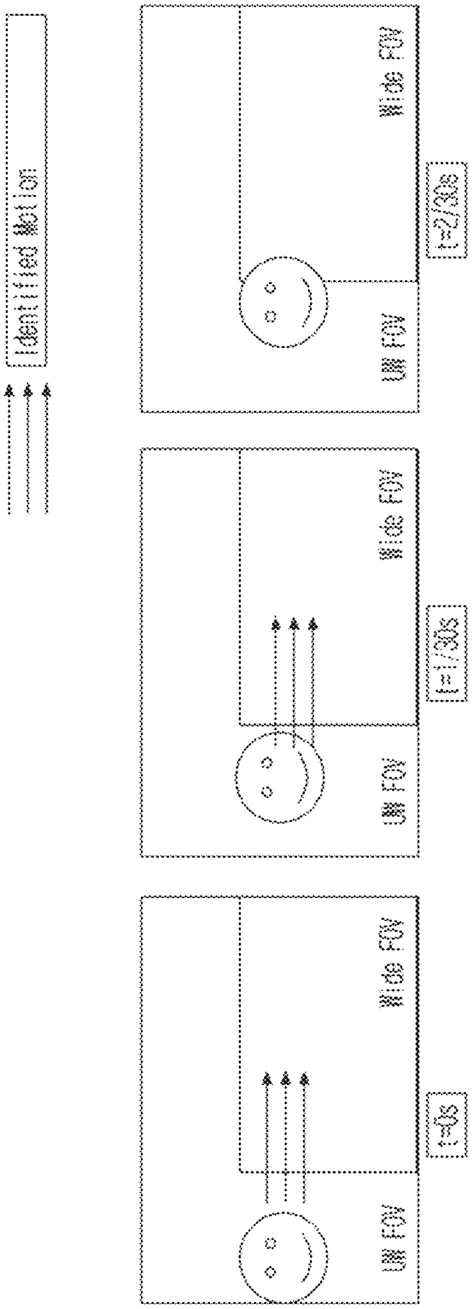
FIG. 6 illustrates an example scenario of a identified motion, according to an embodiment of the present disclosure.

FIG. 6 illustrates an example scenario of the identified motion when a combination of ultra-wide and tele cameras are used, according to an embodiment of the present disclosure. As can be seen from FIG. 6, the object (the smiley face) is present only in the UW FOV and the identified motion helps to determine that the object is going to enter the FOV of the Wide camera, and hence, it is known in advance that the object will enter the FOV of the Wide camera.

Referring back to FIG. 4, after the operation at operation 403, the method 400 performs the operation at operation 405. In particular, at operation 405, the frame selection module 303 may perform a motion analysis on each of the first image frames 505 for selection of one or more frames from the second image frames 517. For performing the motion analysis, the frame selection module 303 may determine a level of overlap of at least one image between two consecutive first types of frames in the first image frames 505 with a second threshold value and identified motion information. Thereafter, the frame selection module 303 skips one or more frames of the second image frames 517 based on the determination that the level of overlap of the at least one image in the two consecutive frames in the second image frames 517 is less than a threshold value. Relative motion between two frames may be represented by level of overlap of the at least one image. The level of overlap of the at least one image may be described as 'level of overlap', 'degree of overlap' or 'overlap information'.

According to an embodiment, if it is determined that the level of overlap of the at least one image in the two consecutive first type of frames in the first image frames 505 is more than the threshold value, then the one or more frames are selected from the second image frame 517. Accordingly, the level of overlap indicates that a motion is present between the two consecutive frames. The frame selection shall be explained with the help of example in the forthcoming paragraphs.

According to an embodiment, the frame selection module 303 performs global speed based frame selection. Accordingly, the motion detection is performed on the frames captured by the ultra-wide camera 503 501 (or Ultra-wide frame, UW frame) to determine whether there is a motion between two consecutive frames of the frames captured by the ultra-wide camera 501. Referring to FIG. 5, the first image frames 505 are the frames captured by the ultra-wide camera 501. Now, in case 1, if there is the motion detection between frames captured by the ultra-wide camera 501 then the frame selection module 303 further checks on the frames captured by the Wide camera 503 for relative motion. Referring to FIG. 5, the second image frames 517 is the frames captured by the ultra-wide camera 501. Further, in case 2, if it is determined that there is no motion between the UW frame, then that implies all of the frames captured between these two frames of the frames captured by the ultra-wide camera 501 in time also do not have any motion. Thus, frame selection module 303 further skips and drops all frames between this time from the frames captured by the wide camera 503 (wide frame) as well. The aforesaid two cases are explained in FIGS. 7A and 7B.

Figure 7A:
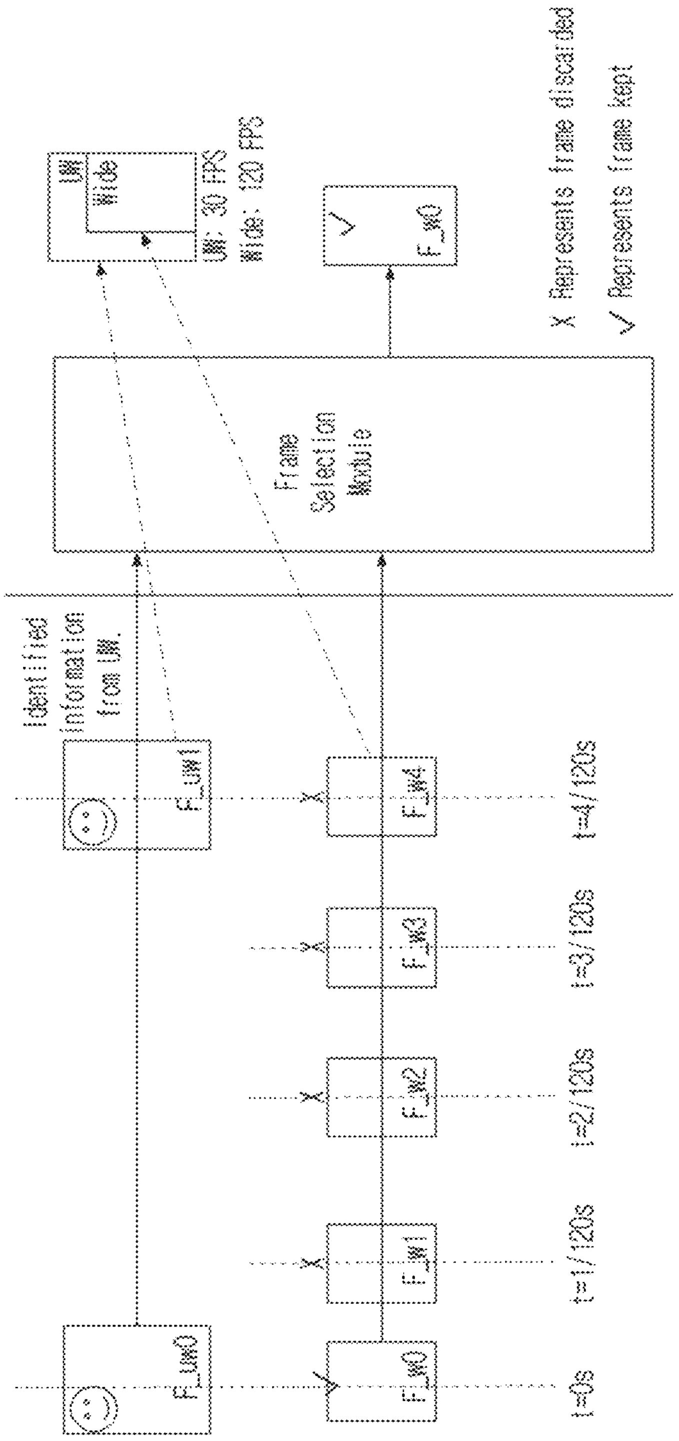
FIG. 7A illustrates an example scenario where no motion is present between consecutive frames captured by the ultra-wide camera when using a combination of ultra-wide and wide cameras, according to an embodiment of the present disclosure.

FIG. 7A illustrates an example scenario where no motion is present between consecutive frames captured by the ultra-wide camera 501 when using a combination of ultra-wide camera 501 and wide camera 503, according to an embodiment of the present disclosure. As can be seen from FIG. 7A, there is no relative motion present between the frames captured by the ultra-wide camera 501 F_uw0 and F_uw1, thus it is concluded that there will be no motion present between frames, captured by the wide camera 503, F_w1, F_w2, F_w3, F_w4. Thus, only F_w0 frame is selected as it is assumed that there is motion present between previous frames captured by the ultra-wide camera 501.

Figure 7B:
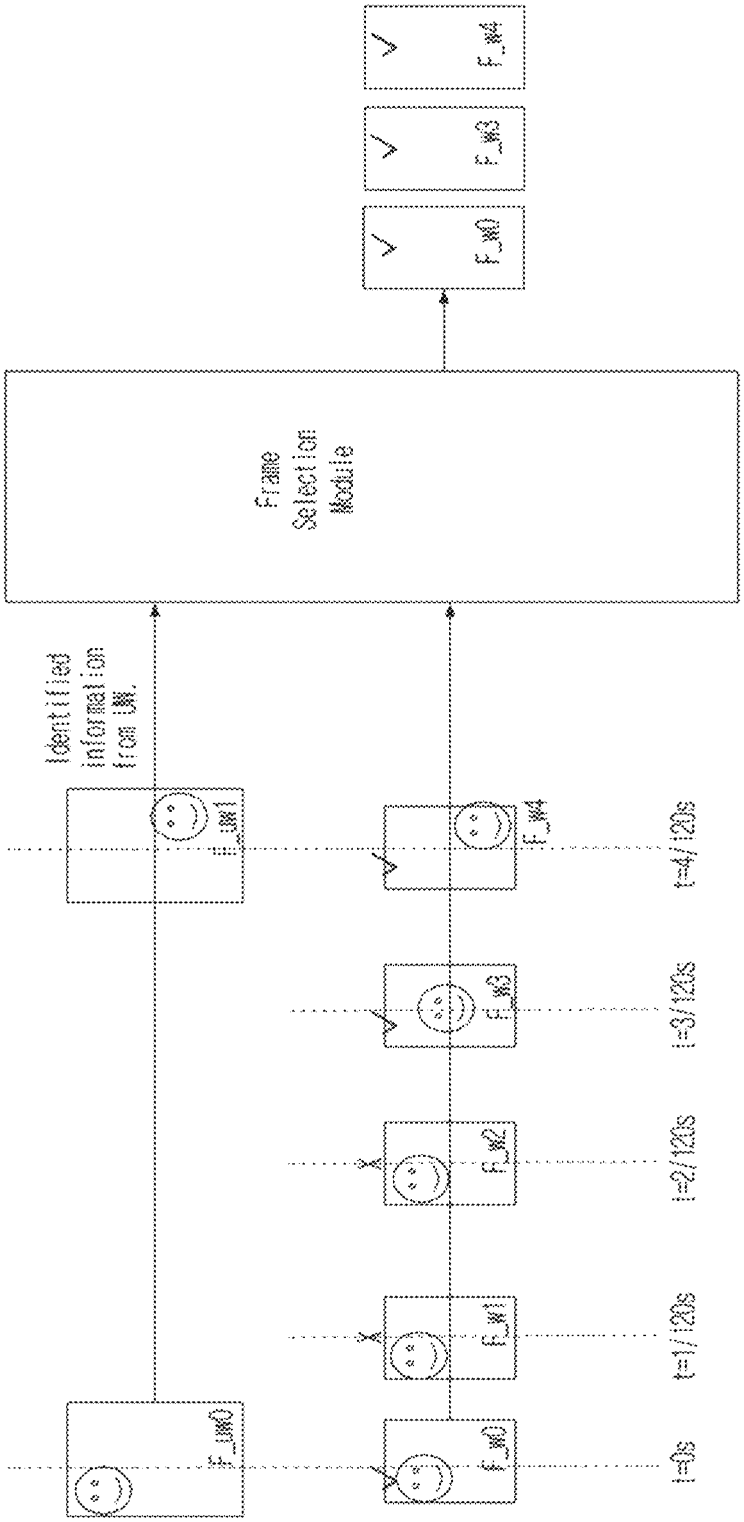
FIG. 7B illustrates an example scenario where motion is present between consecutive frames captured by the ultra-wide camera when using a combination of ultra-wide and wide cameras, according to an embodiment of the present disclosure.

FIG. 7B illustrates an example scenario where motion is present between consecutive frames captured by the ultra-wide camera 501 when using a combination of ultra-wide camera 501 and wide camera 503, according to an embodiment of the present disclosure. As can be seen from FIG. 7B, there is relative motion present between the frames captured by the ultra-wide camera 501 F_uw0 and F_uw1. However, in this case, it cannot be determined whether there is motion present between frames captured by the wide camera 503 or not. Therefore, in this case, the frames captured by the wide camera 503 are compared with each other to check for relative motion. Based on this F_w0, F_w3 and F_w4 are selected for further processing as relative motion is detected in the image frames. Table 1 depicts the methodology for selection of frames captured by the wide camera 503 based on global speed based frame selection. Table 1 depicts the methodology of the global speed based frame selection algorithm.

TABLE 1

```
def compareRelativeMotion (frame1, frame2, globalSkip=False):
  If globalSkip is True:
  Return dropFrame=True
  Calculate the image_overlap between two frames
  If image_overlap>thresh_overlap:
  dropFrame = True
  else # The overlap is less and hence motion is there
  dropFrame = False
  4. return dropFrame
```

Performing the global speed based frame selection on frames captured by the wide camera 503 may include: determining whether motion is present between consecutive frames captured by ultra-wide camera 501 by determining a level of overlap between two consecutive frames and if motion is present between consecutive frames captured by ultra-wide camera 501, perform further operation on frames captured by the wide camera 503 to determine whether motion is present between consecutive frames captured by wide camera 503 by determining a level of overlap between two consecutive frames. The operation also includes determining whether motion is present between consecutive frames captured by ultra-wide camera 501 by determining a level of overlap between two consecutive frames and if motion is not present between consecutive frames captured by ultra-wide camera 501 not doing any further operation on frames captured by the wide camera 503 to determine whether motion is present.

Now referring back to FIG. 4, after selecting the frames from the second image frames 517 based on the output of the frame selection module 303, the frame generator module 305 is further configured to identify motion gaps in each of the subsequent frames among the selected one or more frames at operation 407. In particular, the frames from the frame selection module 303 often have "Missing Motion Gaps." These motion gaps are normally not visible to the naked eye when the video is being played. The same gap cannot be filled if all the pictures are viewed together at the same time. The motion gaps may indicate that there is missing motion information between two frames. Therefore, it is important to generate these missing motion gaps to generate better output. According to the embodiment, the frame generator module 305 primarily performs the following operations: (1) Identify the missing motion-gaps between the consecutive frames; (2) Estimate the number of frames to be generated if a gap is found; and (3) Generation of In-Place frames.

According to an embodiment, for identification of motion gaps, operation 407, the frame generation module 305 is at first configured to separate at least luma components (i.e., Y component) and chroma components (i.e., UV components) in the selected one or more frames. Thereafter, the frame generation module 305 may calculate a velocity of each pixel in the separated luma components of the selected one or more frames. In particular, a velocity vector v_x and v_y of each pixel in x and y directions for all pixel (x, y) is calculated. After that, the frame generation module 305 may calculate a speed of each pixel in the separated luma components of the selected one or more frames based on the calculated velocity. In order to calculate the speed, a Euclidean approach is used based on equation 1.

$$s_{xy} = \sqrt{v_x^2 + v_y^2} \quad \text{Equation 1}$$

Thereafter, the frame generator module 305 may determine whether the speed of each of the pixel is greater than a threshold value. If it is determined that the speed of each of pixel is greater than the threshold value, then the frame generator module 305 may identify the motion gaps in each of the frames. The multi-camera device 200 may calculate the velocity vector vx and vy of each pixel in x and y direction for all pixel(x,y). Then the multi-camera device 200 may calculate the speed using Euclidean approach. The multi-camera device 200 may identify missing motion for any pixel(x,y). The threshold is the minimum speed that a pixel should have to be considered in motion. After identifying the missing motion gaps, the frame generator module 305 may determine a maximum speed of each pixel in the separated luma components of the selected one or more frames. After that, the frame generator module 305 may estimate a number of frames that is to be generated as the one or more in-place frames based on the determined maximum speed and a maximum allowable speed. The maximum allowable speed is defined such that image information in each of the selected one or more frames is devoid of the motion gaps in each of the frames among the selected one or more frames. A number of frames to be generated may be equivalent to max_pixel_speed divided by near_pix_vel. Where max_pixel_speed is maximum pixel speed across all pixels and near_pix_vel may be maximum velocity allowed to have between consecutive frames such that image information remains complete and no motion gaps are visible.

Referring back to FIG. 4, at operation 409, the frame generator module 305 may generate one or more in-place frames after the identification of the motion gaps. The Frame Generator module 305 may take up frames from frame selection module 303. The Frame Generator module 305 may use In-Place frame generation using Conventional technique or AI based Frame Generation to fill missing motion gaps. The in-place frames are the frames that fill the motion gaps. The in-place frames may be generated using conventional techniques or AI based Frame Generation. As can be seen in FIG. 5, the frame generated module 305 outputs dropped frames 519, generated frames/in-place frames 504, and at least one frame among the second image frames 517 which is obtained from the wide camera 503 (frames captured by the wide camera as per the example shown in FIG. 5).

According to an embodiment, the output of the frame generator module 305 is provided as an input to the motion dramatizer module 307. The motion dramatizer module 307 may generate a motion dramatizer image based on the in-place frames at operation 411. In particular, for generating the motion dramatizer image, the motion dramatizer module 307, at first, may align the luma components in the selected one or more frames with each other, as aligning the luma component is faster than aligning the RGB component. Thereafter, the motion dramatizer module 307 may merge at least the aligned luma components with the chroma components of the selected one or more frames, the second image frames 517, and the skipped one or more frames from the wide camera 503. After that, the motion dramatizer module 307 may generate the one or more motion dramatizer frames based on the merging.

Figure 8A:
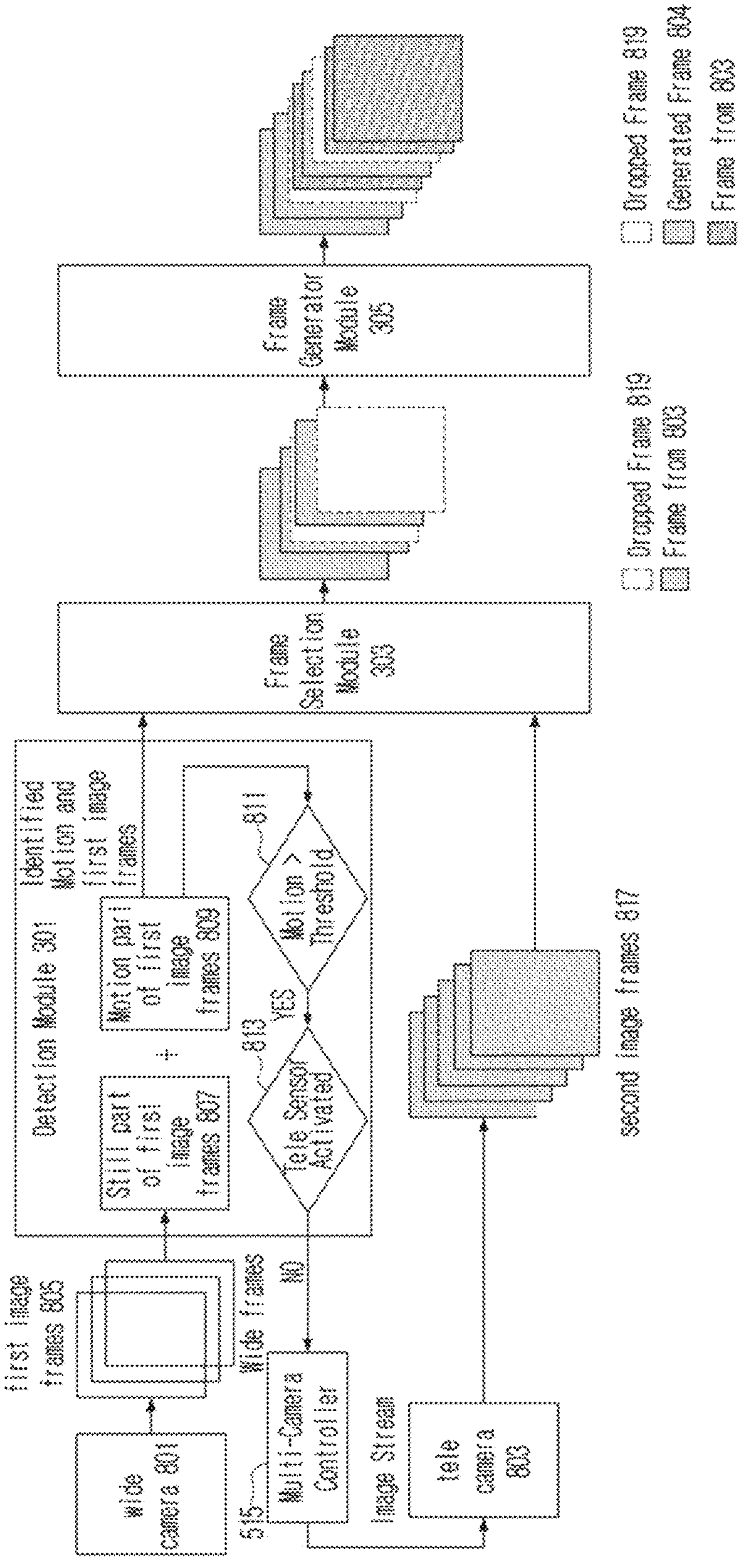
FIG. 8A illustrates an example embodiment for long exposure photography in the multi-camera device using a combination of wide and tele cameras, according to an embodiment of the present disclosure.

FIG. 8A illustrates an example embodiment of long exposure photography in a multi-camera device by using a combination of wide and tele cameras, according to an embodiment of the present disclosure. FIG. 8A shows a wide camera 801 in combination with a tele camera 803 that operates in different frame rates. According to the example embodiment, the first camera herein corresponds to the wide camera 801 and the second camera herein corresponds to the tele camera 803. Referring to FIG. 8A, a first image frames 805 are the frames captured (or obtained or generated) by the wide camera 801 and second image frames 817 are the frames captured by the tele camera 803. The operation of the example embodiment is analogous to the example embodiment shown in FIG. 5 and explained above through FIG. 4-7B, therefore for the sake of brevity, detailed explanation of the same is omitted here.

Figure 8B:
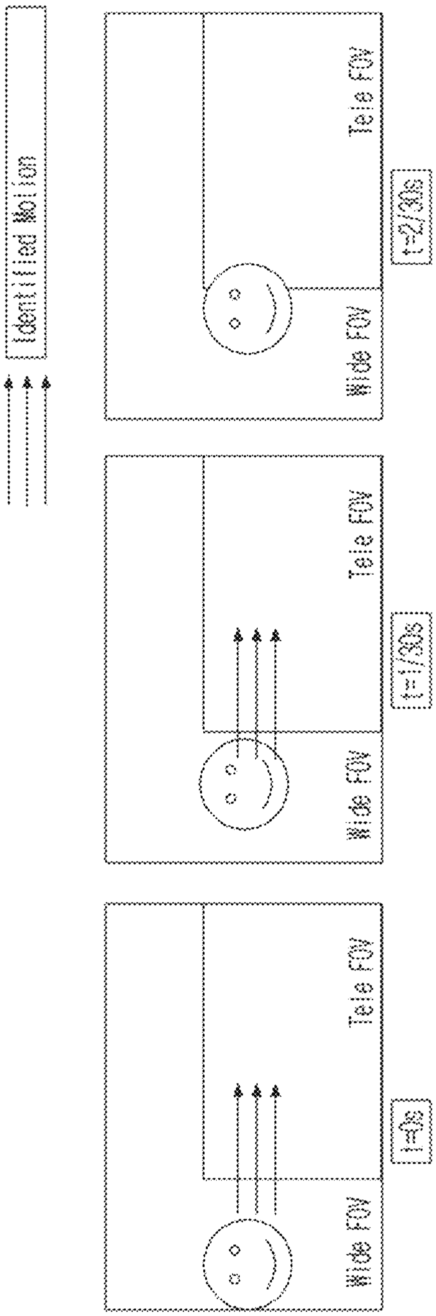
FIG. 8B illustrates an example scenario of the identified motion where a combination of ultra-wide and tele cameras are used, according to an embodiment of the present disclosure.

FIG. 8B illustrates an example scenario of the identified (or detected) motion when combination of wide camera 801 and tele camera 803 is used, according to an embodiment of the present disclosure. As can be seen from FIG. 8B, the object is present only in the FOV of the Wide camera and the identified motion helps to determine that the object is going to enter the tele FOV, and hence, it is known in-advance about the object entering in the tele FOV.

Figure 8C:
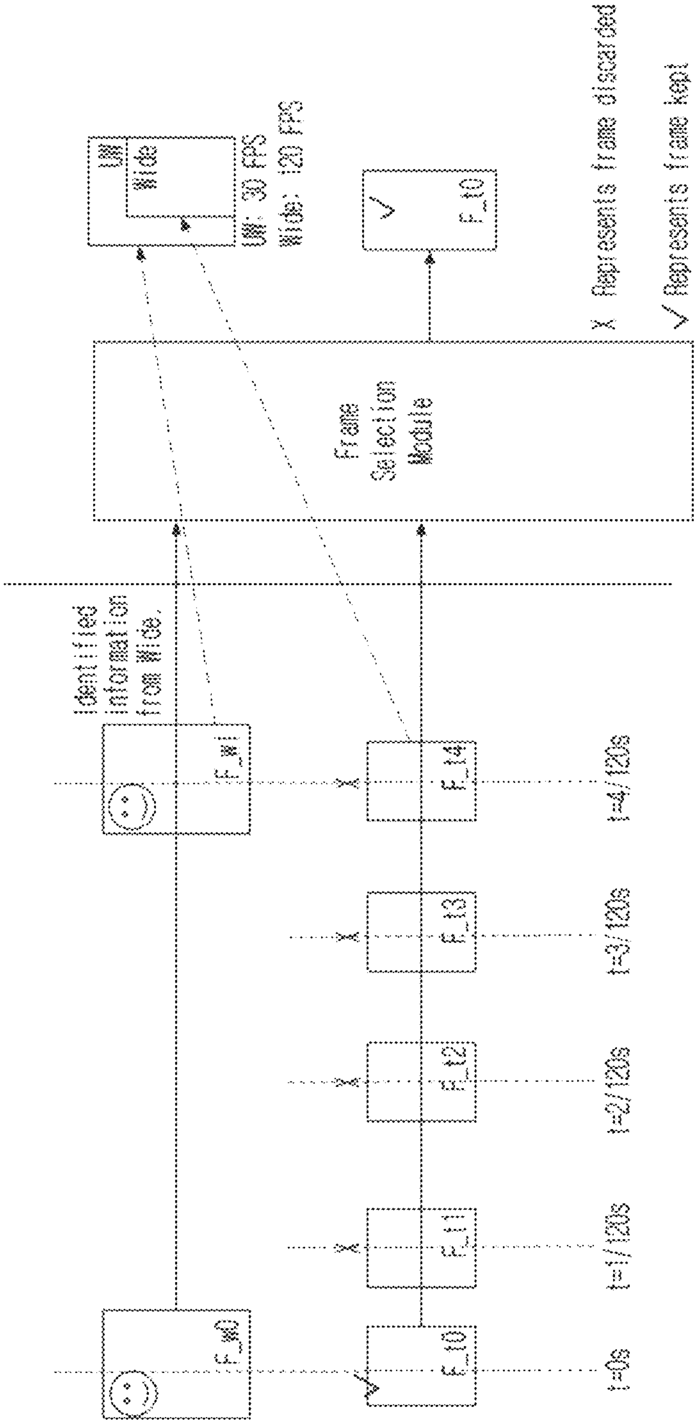
FIG. 8C illustrates an example scenario where no motion is present between consecutive frames captured by the ultra-wide camera when using a combination of wide and tele cameras, according to an embodiment of the present disclosure.

FIG. 8C illustrates an example scenario where no motion is present between consecutive frames captured by the wide camera 801 when the combination of wide camera 801 and tele camera 803 is used, according to an embodiment of the present disclosure. As can be seen from FIG. 8B, there is no relative motion present between the frames, captured by the wide camera 801, F_w0 and F_w1, thus it is concluded that there will be no motion present between tele frames F_t1, F_t2, F_t3, F_t4. Thus, only F_t0 frame is selected as it is assumed that there is motion present between previous frames captured by the wide camera 801. The FOV of the wide camera 801 may be more than the FOV of the tele camera 803. There may be no information before F_t0.

Figure 8D:
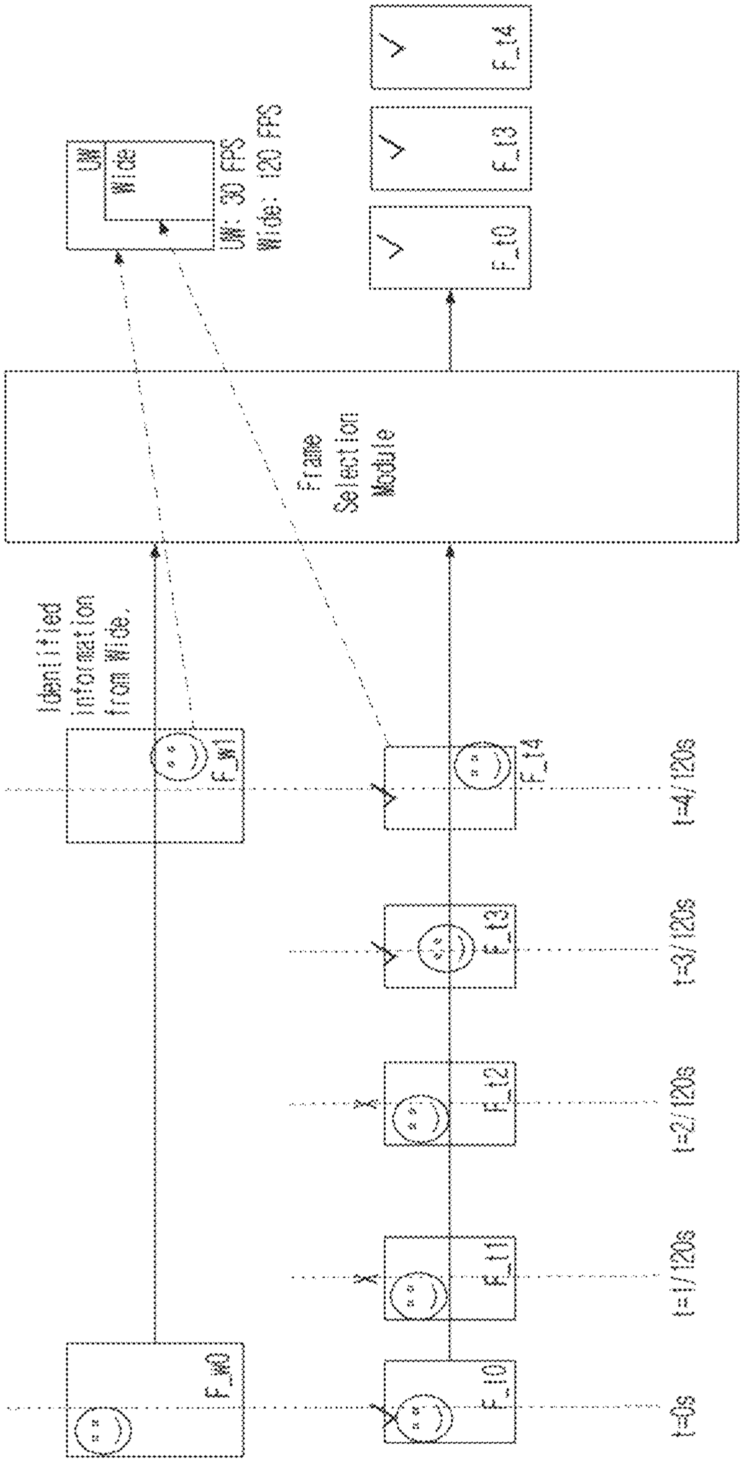
FIG. 8D illustrates an example scenario where motion is present between consecutive frames captured by the ultra-wide camera when using a combination of wide and tele cameras, according to an embodiment of the present disclosure.

FIG. 8D illustrates an example scenario where motion is present between consecutive frames captured by the wide camera 503 when the combination of ultra-wide and tele is used, according to an embodiment of the present disclosure. As can be seen from FIG. 8C, there is relative motion present between the frames, captured by the wide camera 801, F_w0 and F_w1. However, in this case, it cannot be concluded if there is motion present between frames, captured by the wide camera 801, or not. Therefore, in this case, frames, captured by the wide camera 801, are compared with each other. Based on this F_t0, F_t3 and F_t4 are kept/selected.

FIG. 9 illustrates an operation flow in a scenario where the user is operating the multi-camera device, according to an embodiment of the present disclosure. FIG. 9 shows a process 900 in a scenario where the user is operating the multi-camera device 200. According to an embodiment, at operation 902, an application for operating a camera in the multi-camera device 200, is launched. At operation 904, the application initiates the camera in the multi-camera device 200 to start the recording. In an example, the application may capture the frame in still image mode or video mode. The application may operate as specific capturing mode for the motion dramatization through the motion dramatizer. Thereafter, at operation 906, the application will continue capturing the frame based on the user input. That is to say, the application will continue capturing the frame till the user provides any input related to stop capturing the frame/stop recording and the like. In the specific capturing mode, then operation 908 is executed through the motion dramatizer. Accordingly, at operation 908, the motion information in the captured frames is detected by the detection module 301 thereby obtaining the motion information. The operation of the detection module 301 is explained above, therefore for the sake of brevity, detailed explanation of the same is omitted here. The operation 908 corresponds to operation 403 of FIG. 4. Thereafter, at operation 910, the process 900 includes comparing the captured frames for identifying the relative motion of the subject in the captured frame. The operation 910 is performed by the frame selection module 303 and the operation of the frame selection module 303 is explained above, therefore for the sake of brevity detailed explanation of the same is omitted here. At operation 912, the process 900 includes determining to drop/skip the captured frame based on the identified relative motion. At operation 914, the frame is discarded. Moving forward at operation 916, the process 900 includes storing the selected frames in an array and the process is returned to operation 904. The operations 910, 912, and 914 correspond to operation 403 of FIG. 4. At operation 918, as the process to capture the frame is stopped, and the system is looking for missing gaps and the AI based frames/in-place frames are generated using AI techniques to add necessary information for the dramatization effect that may be missing due to hardware capabilities of the image sensor. In the present disclosure, at operation 920 the AI based frames and the selected frames stored in the array are merged and thereafter creates the motion dramatization. The operations 918 and 920 correspond to operations 403, 407, 409, and 411. At operation 922, the process 900 includes storing the frame with the motion dramatization.

Figure 10:
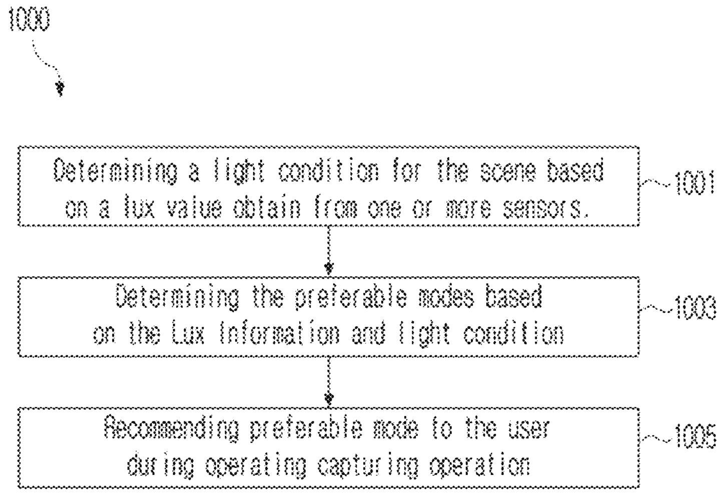
FIG. 10 illustrates a flow chart for a recommendation of the various modes to the user, according to the embodiment of the present disclosure.

FIG. 10 illustrates a flow chart for recommendation of various modes to the user, according to an embodiment the present disclosure. Initially, when the user starts the camera for capturing the scene, the applications related to the camera are utilized. The multi-camera device 200 obtains various data from the one or more sensors to further obtain lux value (i.e., luminous value). Accordingly, at operation 1001, the multi-camera device 200 determines a light condition for the scene based on the lux value obtain from the one or more sensors. The light condition includes a daylight condition and a night light condition of the scene. Thereafter, based on the lux value and the light condition, the multi-camera device 200 may determine preferable modes. For night light conditions, the modes are flash Painting, neon trails and night sky. For day light conditions, the modes are a motion portrait, and a silk effect.

Figure 11:
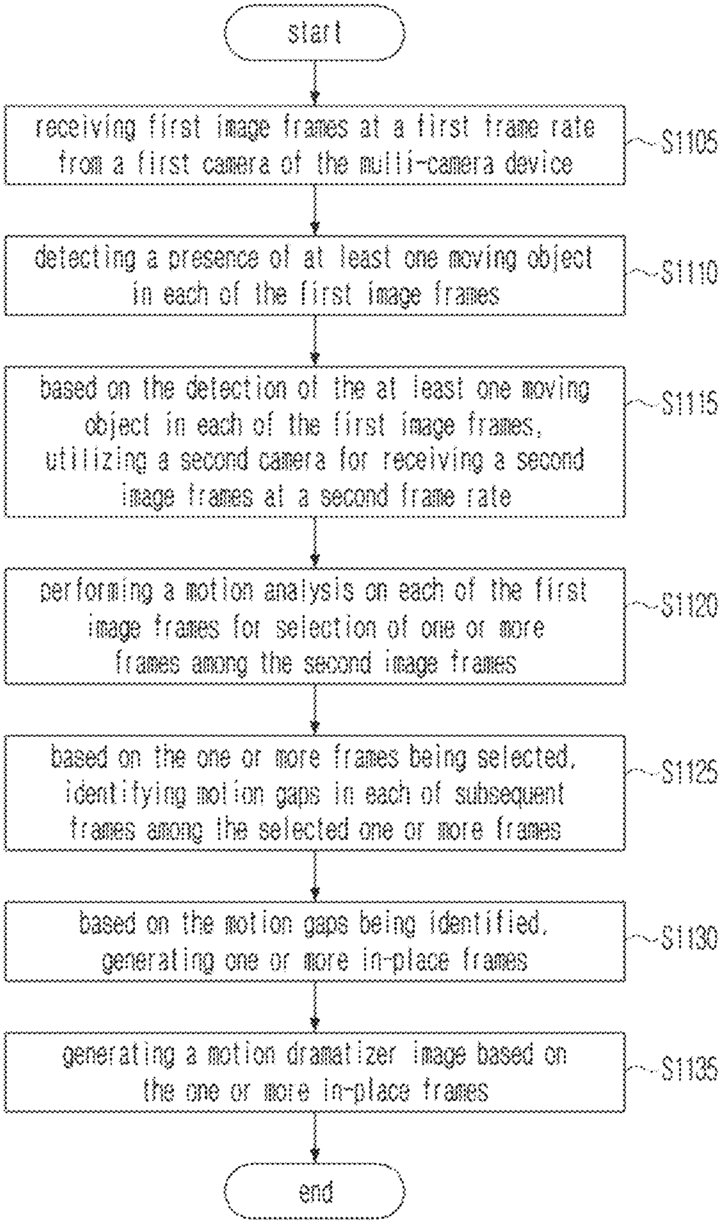
FIG. 11 illustrates a method of controlling an electronic apparatus, according to an embodiment of the present disclosure.

FIG. 11 illustrates a controlling method of an electronic apparatus, according to an embodiment of the present disclosure.

The controlling method of an electronic apparatus for long exposure photography in a multi-camera device includes receiving first image frames at a first frame rate from a first camera of the multi-camera device (S1105), detecting (or identifying) a presence of at least one moving object in each of the first image frames (S1110), based on the detection of the at least one moving object in each of the first image frames, utilizing (or activating) a second camera for receiving second image frames at a second frame rate (S1115), performing a motion analysis on each of the first image frames for selection of one or more frames among the second image frames (S1120), based on the one or more frames being selected, identifying motion gaps in each of subsequent frames among the selected one or more frames (S1125), based on the motion gaps being identified, generating one or more in-place frames (S1130), and generating a motion dramatizer image based on the one or more in-place frames (S1135).

The in-place frames may be used for filling the identified motion gaps. The in-place frames may be described as additional frames, sub-frames or generated frames.

The motion dramatizer image may be described as a merged image or an output image. The motion dramatizer image may be described as motion dramatizer frames.

The detecting a presence of at least one moving object (S1110) may include identifying one or more still frames and one or more motion frames among the first image frames, comparing a motion value in each of the identified one or more motion frames with a first threshold value, and detecting the presence of the at least one moving object in each of the first image frames based on the comparison.

The still frames may be described as a still part, a fixed frames or a fixed part. The still frames may be described as a first style frames. The first style frames may be frames including a fixed object (or subject). The first style frames may be frames which is not including a moving object (or subject).

The motion frames may be described as a motion part, a moving part, a moving frames, a movable part or a movable frames. The motion frames may be described as a second style frames. The second style frames may be frames including a moving object (or subject).

The detecting a presence of at least one moving object (S1110) may include obtaining the motion value in each of the identified one or more motion frames and comparing the obtained motion value with the first threshold value.

The detecting the presence of the at least one moving object in each of the first image frames based on the comparison may include detecting the presence of the at least one moving object in each of the first image frames when the motion value in each of the identified one or more motion frames exceeds the first threshold value, and the method further may include storing the identified one or more motion frames.

The performing the motion analysis on each of the first image frames (S1120) may include determining a level of overlap of at least one image between two consecutive first type of frames in the first image frames based on a comparison of the at least one image between two consecutive first type of frames with a second threshold value and identified motion information. The first image frame may include one or more first type of frames, and second image frame may include one or more second type of frames. The identified motion information may be obtained based on the detection of the presence of the at least one moving object in each of the first image frames. The one or more first type of frames and the one or more second type frames may include one or more images. The performing the motion analysis on each of the first image frames (S1120) may include skipping one or more second type of frames based on the determination that the level of overlap of the at least one image in the two consecutive first type of frames in the second image frames is less than the second threshold value.

The method may further include selecting the one or more frames from the second image frames based on the determination that the level of overlap of the at least one image in the two consecutive first type of frames in the first image frames is more than the second threshold value. The level of overlap may indicate a motion between the two consecutive first type of frames. The selected the one or more frames may correspond to the one or more second types of frames.

The identifying motion gaps (S1125) may include separating at least luma components and chroma components in the selected the one or more frames, calculating a velocity of each pixel in the separated luma components of the selected the one or more frames, calculating a speed of each pixel in the separated luma components of the selected the one or more frames based on the calculated velocity, determining whether the speed of the each of the pixel is greater than a third threshold value, and identifying the motion gaps in each of the frames based on the determination that the speed of the each of the pixel is greater than the third threshold value.

The method may further include determining a maximum speed of each pixel in the separated luma components of the selected the one or more frames, and estimating a number of frames to be generated as the one or more in-place frames based on the determined maximum speed and a maximum allowable speed. The maximum allowable speed may be defined such that an image information in each of the selected one or more frames is devoid of the motion gaps in each of the frames among the selected one or more frames.

The maximum allowable speed may be obtained such that an image information in each of the selected one or more frames is not include the motion gaps in each of the frames among the selected one or more frames. The maximum allowable speed may be obtained such that the image information is not exist the motion gaps.

The generating the motion dramatizer image (S1135) may include aligning the luma components in the selected the one or more frames with each other, merging at least the aligned luma components with the chroma components of the selected the one or more frames, the second image frames, the skipped one or more second type of frames, and generating the motion dramatizer image based on the merging.

The method may further include determining a light condition based on a lux value obtain from one or more sensors. The light condition may include a lowlight condition and a night light condition of the scene. The method may further include recommending at least one mode from one or more modes based on the determination of the light condition. The motion dramatizer image may be generated based on a selection of the recommended at least one mode.

The first type of frames may correspond to one of frames captured by an ultra wide camera 501 or frames captured by a wide camera 503. The second type of frames may correspond to one of frames captured by the wide camera 503 and frames captured by a telephoto camera.

Figure 12:
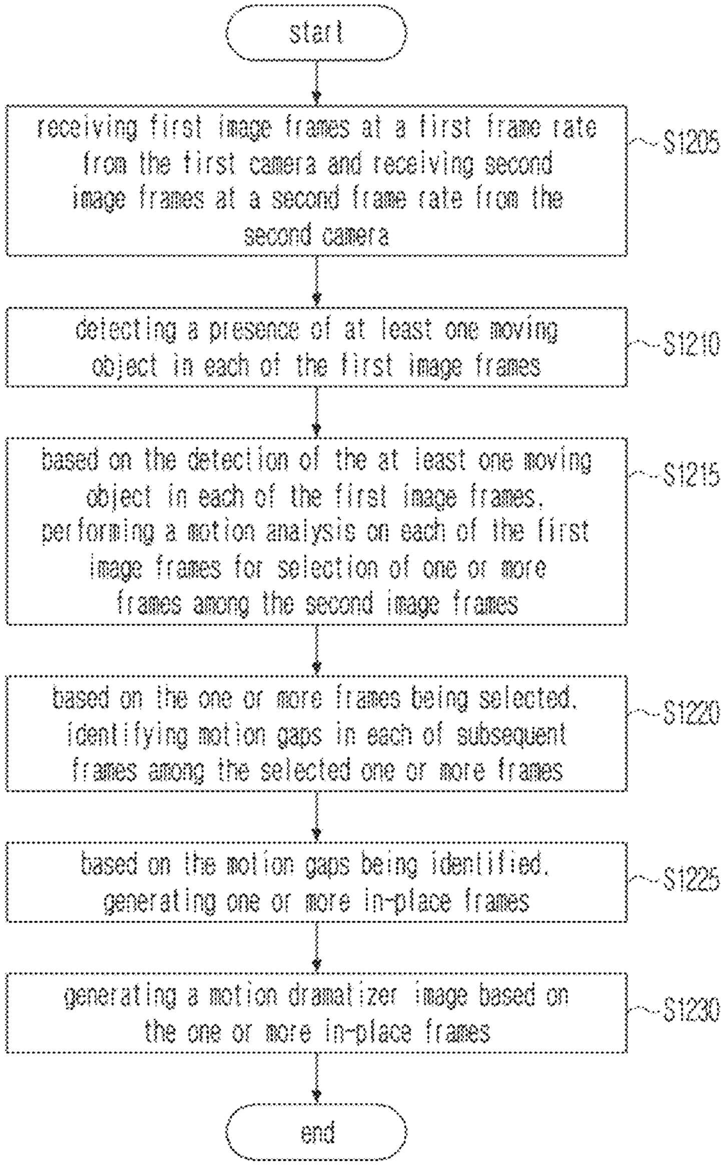
FIG. 12 illustrates a method of controlling an electronic apparatus, according to another embodiment of the present disclosure.

FIG. 12 illustrates a controlling method of an electronic apparatus, according to another embodiment of the present disclosure.

A method for controlling an electronic apparatus for long exposure photography in a multi-camera device including a first camera and a second camera, the method may include receiving first image frames at a first frame rate from the first camera and receiving second image frames at a second frame rate from the second camera, detecting a presence of at least one moving object in each of the first image frames, based on the detection of the at least one moving object in each of the first image frames performing a motion analysis on each of the first image frames for selection of one or more frames among the second image frames, based on the one or more frames being selected identifying motion gaps in each of subsequent frames among the selected one or more frames, based on the motion gaps being identified generating one or more in-place frames and generating a motion dramatizer image based on the one or more in-place frames.

The method may utilize the first camera and the second camera. The method may obtain the first image frames and the second image frames at the same time. The first camera may capture at least one of frames by a predetermined control signal. The second camera may capture at least one of frames by a predetermined control signal.

The method may obtain the first image frames while the second camera is powered-on. The method may obtain the second image frames while the first camera is power-on.

The detailed description on parts overlapping with the configurations illustrated in FIG. 11 from among the operations illustrated in FIG. 12 will be omitted.

According to various embodiment of the present disclosure, the method may only obtain the first image frames while the second camera is power-on. However, the method may obtain the second image frames when a predetermined event is identified. The predetermined event is an event that the at least one moving object in each of the first image frames is identified.

According to various embodiment of the present disclosure, the method includes detecting a presence of at least one moving object based on at least one of the first image frames or the second image frames. The method may obtain the first image frames and the second image frames. The method may include, based on the detection of the at least one moving object according to the at least one of the first image frames or the second image frames, performing a motion analysis on each of the first image frames for selection of one or more frames among the second image frames.

According to various embodiment of the present disclosure, an electronic apparatus for controlling an electronic apparatus for long exposure photography in a multi-camera including a first camera and a second camera device may include at least one processor.

The at least one processor may receive first image frames at a first frame rate from the first camera and receiving second image frames at a second frame rate from the second camera, detect a presence of at least one moving object in each of the first image frames, based on the detection of the at least one moving object in each of the first image frames perform motion analysis on each of the first image frames for selection of one or more frames among the second image frames, based on the one or more frames being selected identify motion gaps in each of subsequent frames among the selected one or more frames, based on the motion gaps being identified generate one or more in-place frames and generate a motion dramatizer image based on the one or more in-place frames.

Some example embodiments disclosed herein may be implemented using processing circuitry. For example, some example embodiments disclosed herein may be implemented using at least one software program running on at least one hardware device and performing network management functions to control the elements.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The method in the various examples of the disclosure described above may be implemented in the form of an application which may be installed on the existing electronic apparatus.

In addition, the method in the various examples of the disclosure described above may be implemented only by software upgrade or hardware upgrade for the existing electronic apparatus.

In addition, the various embodiments of the disclosure described above may be performed through an embedded server included in the electronic apparatus, or an external server of at least one of the electronic apparatus or a display device.

According to an example embodiment of the disclosure, the various examples described above may be implemented by software including an instruction stored in a machine-readable storage medium (for example, a computer-readable storage medium). A machine may be a device that invokes the stored instruction from the storage medium and operates based on the invoked instruction, and may include the electronic apparatus in the disclosed examples. In case that the instruction is executed by the processor, the processor may directly perform a function corresponding to the instruction or other components may perform the function corresponding to the instruction under a control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not divide whether data are semi-permanently or temporarily stored in the storage medium.

In addition, according to various embodiments of the disclosure, the method in the various examples described above may be provided by being included in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program product may be at least temporarily stored in a storage medium such as a memory of a server of a manufacturer, a server of an application store or a relay server, or be temporarily provided.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, at least some of the operations may be performed in a different order or be omitted, or other operations may be added.

Although the embodiments of the disclosure are shown and described hereinabove, the disclosure is not limited to the above-mentioned specific embodiments, and may be variously modified by those skilled in the art to which the disclosure pertains without departing from the scope and spirit of the disclosure as disclosed in the accompanying claims. These modifications also need to be understood to fall within the scope of the disclosure.

What is claimed is:

1. A method for controlling an electronic apparatus for performing long exposure photography in a multi-camera device, the method comprising:
- receiving first image frames at a first frame rate from a first camera of the multi-camera device;
- detecting a presence of at least one moving object in each of the first image frames;
- based on the detection of the at least one moving object in each of the first image frames, utilizing a second camera for receiving second image frames at a second frame rate;
- performing a motion analysis on each of the first image frames;
- selecting one or more frames among the second image frames based on the motion analysis;
- based on the one or more frames among the second image frames being selected, identifying motion gaps in each of subsequent frames among the selected one or more frames;
- based on the motion gaps being identified, generating one or more in-place frames; and
- generating a motion dramatizer image based on the one or more in-place frames.

2. The method of claim 1, wherein the detecting the presence of the at least one moving object comprises:
- identifying one or more still frames and one or more motion frames among the first image frames;
- comparing a motion value in each of the identified one or more motion frames with a first threshold value; and
- detecting the presence of the at least one moving object in each of the first image frames based on the comparison.

3. The method of claim 2,
- wherein the detecting the presence of the at least one moving object in each of the first image frames based on the comparison comprises:
  - detecting the presence of the at least one moving object in each of the first image frames based on the motion value in each of the identified one or more motion frames exceeding the first threshold value, and
- wherein the method further comprises:
  - storing the identified one or more motion frames.

4. The method of claim 1,
- wherein the first image frames include one or more first type of frames, and the second image frames include one or more second type of frames, and
- wherein the performing the motion analysis on each of the first image frames comprises:
  - determining a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skipping one or more of the one or more second type of frames based on the determination that the level of overlap of the at least one image in the two consecutive first type of frames in the second image frames is less than the second threshold value.

5. The method of claim 4, wherein the selecting the one or more frames among the second image frames based on the motion analysis further comprises selecting the one or more frames among the second image frames based on the determination that the level of overlap of the at least one image in the two consecutive first type of frames in the first image frames is more than the second threshold value, wherein the level of overlap indicates a motion between the two consecutive first type of frames, and wherein the selected one or more frames corresponds to the one or more second type of frames.

6. The method of claim 5, wherein the identifying motion gaps comprises:

separating luma components and chroma components in the selected one or more frames;

calculating a velocity of each pixel in the separated luma components of the selected one or more frames;

calculating a speed of each pixel in the separated luma components of the selected one or more frames based on the calculated velocity;

determining whether the speed of each pixel is greater than a third threshold value; and identifying the motion gaps in each of the one or more frames based on the determination that the speed of each pixel is greater than the third threshold value.

7. The method of claim 6, further comprising:

determining a maximum speed of each pixel in the separated luma components of the selected the one or more frames; and estimating a number of frames to be generated as the one or more in-place frames based on the determined maximum speed and a maximum allowable speed, wherein the maximum allowable speed is based on image information indicating whether each of the selected one or more frames is devoid of the motion gaps.

8. The method of claim 6, wherein the generating the motion dramatizer image comprises:

aligning the luma components in the selected one or more frames with each other;

merging the aligned luma components with the chroma components of the selected one or more frames, the second image frames, and the skipped one or more second type of frames; and generating the motion dramatizer image based on the merging.

9. The method of claim 4, wherein the one or more first type of frames corresponds to one of frames captured by an ultra wide camera or frames captured by a wide camera, and wherein the one or more second type of frames corresponds to one of frames captured by the wide camera and frames captured by a telephoto camera.

10. The method of claim 1, further comprising:

determining a light condition based on a lux value obtained from one or more sensors, wherein the light condition comprises at least one of a lowlight condition or a night light condition; and recommending a mode from among one or more modes based on the determination of the light condition, wherein the motion dramatizer image is generated based on a selection of the recommended mode.

11. The non-transitory computer readable medium of claim 1, wherein the detecting the presence of the at least one moving object comprises:

identifying one or more still frames and one or more motion frames among the first image frames;

comparing a motion value in each of the identified one or more motion frames with a first threshold value; and detecting the presence of the at least one moving object in each of the first image frames based on the comparison.

12. The non-transitory computer readable medium of claim 11, wherein the detecting the presence of the at least one moving object in each of the first image frames based on the comparison comprises:

detecting the presence of the at least one moving object in each of the first image frames based on the motion value in each of the identified one or more motion frames exceeding the first threshold value, and wherein the method further comprises:

storing the identified one or more motion frames.

13. A multi-camera device for performing long exposure photography, the multi-camera device comprising:

a first camera;

a second camera;

at least one memory storing one or more instructions; and at least one processor configured to execute the one or more instructions, wherein the one or more instructions, when executed by the at least one processor, cause the multi-camera device to:

receive first image frames at a first frame rate from the first camera;

detect a presence of at least one moving object in each of the first image frames;

based on the detection of the at least one moving object in each of the first image frames, receive second image frames at a second frame rate through the second camera;

perform a motion analysis on each of the first image frames;

select one or more frames among the second image frames based on the motion analysis;

based on the one or more frames being selected, identify motion gaps in each of subsequent frames among the selected one or more frames;

based on the motion gaps being identified, generate one or more in-place frames; and generate a motion dramatizer image based on the one or more in-place frames.

14. The multi-camera device of claim 13, wherein the one or more instructions, when executed by the at least one processor, further cause the multi-camera device to:

identify one or more still frames and one or more motion frames among the first image frames;

compare a motion value in each of the identified one or more motion frames with a first threshold value; and detect the presence of the at least one moving object in each of the first image frames based on the comparison.

15. The multi-camera device of claim 14, wherein the one or more instructions, when executed by the at least one processor, further cause the multi-camera device to:

detect the presence of the at least one moving object in each of the first image frames based on the motion value in each of the identified one or more motion frames exceeding the first threshold value, and store the identified one or more motion frames.

16. The multi-camera device of claim 13, wherein the first image frames include one or more first type of frames, and the second image frames include one or more second type of frames, and wherein the one or more instructions, when executed by the at least one processor, further cause the multi-camera device to:

determine a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skip one or more of the one or more second type of frames based on the determination that the level of overlap of the at least one image in the two consecutive first type of frames in the second image frames is less than the second threshold value.

17. The multi-camera device of claim 16, wherein the one or more instructions, when executed by the at least one processor, further cause the multi-camera device to:

select the one or more frames among the second image frames based on the motion analysis based on the determination that the level of overlap of the at least one image in the two consecutive first type of frames in the first image frames is more than the second threshold value, wherein the level of overlap indicates a motion between the two consecutive first type of frames, and wherein the selected one or more frames corresponds to the one or more second type of frames.

18. A non-transitory computer readable medium having instructions stored therein, which when executed by at least one processor cause the at least one processor to execute a method of controlling an electronic apparatus for performing long exposure photography in a multi-camera device, the method comprising:

receiving first image frames at a first frame rate from a first camera of the multi-camera device;

detecting a presence of at least one moving object in each of the first image frames;

based on the detection of the at least one moving object in each of the first image frames, utilizing a second camera for receiving second image frames at a second frame rate;

performing a motion analysis on each of the first image frames;

selecting one or more frames among the second image frames based on the motion analysis;

based on the one or more frames among the second image frames being selected, identifying motion gaps in each of subsequent frames among the selected one or more frames;

based on the motion gaps being identified, generating one or more in-place frames; and generating a motion dramatizer image based on the one or more in-place frames.

19. The non-transitory computer readable medium of claim 18, wherein the first image frames include one or more first type of frames, and the second image frames include one or more second type of frames, and wherein the performing the motion analysis on each of the first image frames comprises:

determining a level of overlap of at least one image between two consecutive first type of frames among the one or more first type of frames based on a comparison of the at least one image in the two consecutive first type of frames with a second threshold value and identified motion information, wherein the identified motion information is obtained based on the detection of the presence of the of the at least one moving object in each of the first image frames, and wherein the one or more first type of frames and the one or more second type of frames include one or more images, and skipping one or more of the one or more second type of frames based on the determination that the level of overlap of the at least one image in the two consecutive first type of frames in the second image frames is less than the second threshold value.

20. The non-transitory computer readable medium of claim 19, wherein the selecting the one or more frames among the second image frames based on the motion analysis further comprises selecting the one or more frames among the second image frames based on the determination that the level of overlap of the at least one image in the two consecutive first type of frames in the first image frames is more than the second threshold value, wherein the level of overlap indicates a motion between the two consecutive first type of frames, and wherein the selected one or more frames corresponds to the one or more second type of frames.

* * * * *